US008690576B2

(12) United States Patent
Murphy et al.

(10) Patent No.: US 8,690,576 B2
(45) Date of Patent: Apr. 8, 2014

(54) BRAILLE DISPLAY DEVICE AND METHOD OF CONSTRUCTING SAME

(75) Inventors: Patrick Murphy, Riverview, FL (US); Todd Conard, Ruskin, FL (US); Waldemar Tunkis, Palm Harbor, FL (US); Michael Goldenberg, Melbourne Beach, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 213 days.

(21) Appl. No.: 13/407,364

(22) Filed: Feb. 28, 2012

(65) Prior Publication Data

US 2012/0214139 A1    Aug. 23, 2012

Related U.S. Application Data

(63) Continuation-in-part of application No. 12/856,253, filed on Aug. 13, 2010, now Pat. No. 8,177,558, which is a continuation of application No. 12/189,449, filed on Aug. 11, 2008, now Pat. No. 7,775,797, which is a continuation of application No. 10/711,423, filed on Sep. 17, 2004, now Pat. No. 7,410,359.

(60) Provisional application No. 60/481,979, filed on Jan. 30, 2004.

(51) Int. Cl.
*G09B 21/00*    (2006.01)

(52) U.S. Cl.
USPC .......................................... 434/114

(58) Field of Classification Search
USPC ........ 434/112, 113, 114, 115, 117; 400/109.1
See application file for complete search history.

(56) References Cited

U.S. PATENT DOCUMENTS

| | | | |
|---|---|---|---|
| 4,283,178 A | 8/1981 | Tetzlaff | |
| 4,473,356 A | 9/1984 | Fernando et al. | |
| 4,633,121 A | 12/1986 | Ogawa et al. | |
| 4,758,165 A | 7/1988 | Tieman et al. | |
| 4,836,784 A | 6/1989 | Joachim | |
| 5,165,897 A | 11/1992 | Johnson | |
| 5,226,817 A | 7/1993 | Nakajima et al. | |
| 5,449,292 A | 9/1995 | Tani et al. | |
| 5,466,154 A | 11/1995 | Thompson | |
| 5,685,720 A | 11/1997 | Kashi | |
| 5,766,014 A | 6/1998 | Ida et al. | |
| 5,820,377 A | 10/1998 | Murphy et al. | |
| 5,842,867 A | 12/1998 | Hong et al. | |
| 6,109,922 A | 8/2000 | Litschel et al. | |
| 6,217,338 B1 | 4/2001 | Tieman | |
| 6,354,839 B1 | 3/2002 | Schmidt et al. | |
| 6,693,516 B1 | 2/2004 | Hayward | |
| 6,700,553 B2 | 3/2004 | Becker et al. | |

(Continued)

FOREIGN PATENT DOCUMENTS

GB    1595894    8/1981

*Primary Examiner* — Kurt Fernstrom
(74) *Attorney, Agent, or Firm* — GrayRobinson, P.A.; Michael J. Colitz, III

(57) ABSTRACT

Disclosed is a Braille display device. The device supports an array of individual Braille cells with corresponding tactile pins. The pins can be selectively lifted by way of reeds to generate Braille characters that can be felt by the user. The Braille characters can correspond to visible characters, such as characters on a computer screen. The display is refreshable to allow for the sequential display of lines, paragraphs, or pages. In accordance with the disclosure, the Braille cells are constructed in a manner that minimizes manufacturing costs and that also permits the size of the display to be greatly reduced.

16 Claims, 13 Drawing Sheets

(56) References Cited

U.S. PATENT DOCUMENTS

| | | |
|---|---|---|
| 6,705,868 B1 | 3/2004 | Schleppenbach et al. |
| 6,712,613 B2 | 3/2004 | Depta |
| 6,743,021 B2 | 6/2004 | Prince et al. |
| 6,776,619 B1 | 8/2004 | Roberts et al. |
| 6,827,512 B1 | 12/2004 | Souluer |
| 6,881,063 B2 | 4/2005 | Yang |
| 7,018,209 B2 | 3/2006 | Schleppenbach et al. |
| 7,083,416 B1 | 8/2006 | Goldenbert |
| 7,367,806 B1 | 5/2008 | Murphy et al. |
| 7,410,359 B1 | 8/2008 | Murphy et al. |
| 7,462,034 B1 | 12/2008 | Murphy et al. |
| 7,722,355 B2 | 5/2010 | Murphy et al. |
| 7,775,797 B2 | 8/2010 | Murphy et al. |
| 2004/0091842 A1 | 5/2004 | Carro |
| 2004/0175677 A1 | 9/2004 | Koch et al. |
| 2004/0197745 A1 | 10/2004 | Hong et al. |
| 2005/0158695 A1 | 7/2005 | Takahashi |
| 2008/0280266 A1 | 11/2008 | Murphy et al. |
| 2010/0099062 A1 | 4/2010 | Murphy et al. |

BRAILLE DISPLAY DEVICE AND METHOD OF CONSTRUCTING SAME

CROSS-REFERENCE TO RELATED APPLICATIONS

This application is a continuation-in-part of and claims the benefit of priority to co-pending application Ser. No. 12/856,253 filed on Aug. 13, 2010 and entitled "Electromechanical Tactile Braille Cell Assembly," which is a continuation of and claims the benefit of priority to application Ser. No. 12/189,449 filed on Aug. 11, 2008 and entitled "Electromechanical Tactile Braille Cell Assembly", now U.S. Pat. No. 7,775,797, issued Aug. 17, 2010, which is a continuation of Ser. No. 10/711,423 filed on Sep. 17, 2004 and entitled "Electromechanical Tactile Cell Assembly", now U.S. Pat. No. 7,410,359, issued Aug. 12, 2008, which claims priority to provisional application Ser. No. 60/481,979 filed on Jan. 30, 2004 and entitled "Electromechanical Braille Cell and Braille Cell Assembly." The contents of all the foregoing applications are fully incorporated herein for all purposes.

BACKGROUND OF THE INVENTION

1. Field of the Invention

This invention relates to a Braille display device. More particularly, the present invention relates to a refreshable display device employing a construction that is easily manufactured, repaired, and/or serviced.

2. Description of the Background Art

A Braille display is an electromechanical device that connects to a computer by way of a wired or wireless connection. The display consists of a line of tactile cells. Typical displays include 20, 40, or even 80 cells. Each cell, in turn, contains six or eight tactile pins that move up and down in response to electrical voltage. The tactile pins can be driven by mechanical, electromechanical, piezoelectric, pneumatic, or magnetic effects. When in the raised position, the pins extend above a tactile surface and can be felt by a user. By raising certain pins and keeping others below the tactile surface, individual Braille characters can be generated. The series of cells together represent a line of text. After a line has been read the user can refresh the display to allow for additional lines to be presented and read. Braille displays are often combined with other hardware and software to make up an integrated unit. For instance Braille displays are connected in place of video monitors to serve as the display unit, and many units incorporate speech output of the screen prompts. In this regard, computer software is employed to convert a visual image in a screen buffer of the computer into text to be displayed on the Braille display.

Electromechanical tactile cells for use in refreshable Braille displays and graphical tactile displays are known in the art. An exemplary tactile cell as known in the art consists of eight piezoelectric reed elements corresponding to eight tactile pins. The necessary electrical connections and driving forces are provided to actuate the reeds, thereby causing the tactile pins to protrude above a tactile surface to allow the Braille character or graphic element to be displayed. The Braille cells known in the art have not been designed for manufacturability and ease of repair and replacement.

The present state of the art employs piezoelectric bimorph reeds to drive the tactile pins. The bimorph reeds have a common center conductor positioned between two piezoelectric transducers. A simple circuit drives the center conductor and fixes the outer conductor. This arrangement additionally requires that special metallic plating be applied to the outer piezoceramic contacts to enable soldering of the leads to the printed circuit board.

The need for such special metallic plating and individual attachment of the leads increases the manufacturing costs associated with each Braille cell. Current technology requires the use of sixteen hand-soldered leads, requiring thirty two hand-soldered solder joints to establish the electrical connections for each Braille cell in the display. Precise positioning of the reeds is necessary to ensure that the tactile pins extend a definite distance beyond the tactile surface upon actuation of the reed and fully retract below the surface upon request. This precise positioning and alignment of the reeds with the upward trajectory of the tactile pins proves to be very difficult with hand-soldering manufacturing techniques. Additionally, replacement of the reeds for repair of the Braille cell is complicated due to the large number of hand-soldered leads employed in the design.

Prior art Braille cells employ one individual tactile pin cap per individual Braille cell. The tactile pin cap serves to position and align the pins, and provides the cursor control buttons. The Braille cells and associated tactile pins caps positioned adjacent to each other establish the tactile surface. The use of individual cell caps for each Braille cell increases the manufacturing cost and the cost of materials. Additional stabilizers are necessary to position and align the individual cell caps. Strict tolerances are required to provide an acceptable tactile feel for the reader. The reader is sensitive to the separation that is inherent between each cell with this design. This unevenness between each cell plagues all Braille displays known in the prior art. To tactile users, the tactility of the grooves and cell-to-cell unevenness is comparative to the noise or flicker on a computer monitor experienced by a visual user. Additionally, maintenance and replacement of the individual tactile pins is often necessary. Contaminants that build up on the pins must be removed or the pins must be replaced upon excessive wear.

Accordingly, there is a need in the art for an improved electromechanical tactile cell for use in a refreshable Braille display. Improvements in manufacturability and repair are necessary in addition to enhancements in the tactile experience of the user. There is a need for an improved means for securing the piezoelectric reeds to the printed circuit board and establishing the necessary electrical connections. There is additionally a need for an improved alignment procedure for the individual cells that enhances the user interface and allows for easy maintenance of the tactile pins.

However, in view of the prior art considered as a whole at the time the present invention was made, it was not obvious to those of ordinary skill in this field that the identified improvements should be made nor would it have been obvious as to how to make the improvements if the need for such improvements had been perceived.

SUMMARY OF THE INVENTION

One of the advantages afforded by the present Braille display is that it can be made in a very small form factor thereby permitting the display to be transportable and hand held.

Another advantage of the disclosed display is that it can be constructed with minimal labor thereby minimizing manufacturing time and costs.

Yet another advantage is realized by constructing a Braille cell assembly with the aid of an alignment guide, whereby contacts associated with the cell assembly can be quickly and properly oriented upon a printed circuit board.

A further advantage is achieved by providing housings to hold a series of Braille pins, thereby allowing the pins to be easily installed and removed from the Braille display for replacement and/or repair.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

| PARTS LIST | |
|---|---|
| 20 | Display |
| 22 | Power Port |
| 24 | USB Port |
| 26 | Braille Cells |
| 28 | Cursor Router Buttons |
| 34 | Rocker Key |
| 36 | Push Button |
| 38 | Braille Keys |
| 38(a) | Outer Braille Keys |
| 38(b) | Inner Braille Keys |
| 42 | Space Bar |
| 44 | Selector Buttons |

-continued

| PARTS LIST | |
|---|---|
| 46 | Rocker Bars |
| 48 | Panning Buttons |
| 52 | Housing |
| 54 | Upper Cover |
| 56 | Lower Tray |
| 58 | Openings in Upper Cover |
| 62 | Backplane Board |
| 64 | Braille Cell Assemblies |
| 66 | Tactile Pins |
| 68 | Printed Circuit Board (PCB) |
| 72 | Bimorph Reeds |
| 74 | Mounting Block |
| 76 | Housing of Mounting Block |
| 76(a) | Locking Feature on Mounting Block |
| 78 | Depending Forward Edge of Block |
| 82 | Channel in Upper Cover |
| 84 | Walls with Upper Cover |
| 84(a) | Locking Feature on Walls |
| 86 | Rounded Upper Extent of Pins |
| 88 | Collar |
| 92 | Plate |
| 94 | Female Electrical Connector |
| 98 | Male connector on Backplane Board |
| 104 | Stops on PCB |
| 106 | Contacts |
| 108 | Base of Contact |
| 112 | Support Arm of Contact |
| 114 | Biasing Arm of Contact |
| 116 | Fulcrum Point |
| 118 | Alignment Guide |
| 122 | $1^{st}$ Surface |
| 124 | $2^{nd}$ Surface |
| 126 | Alignment Tabs |
| 128 | Alignment Apertures |
| 132 | Peripheral edge |

DETAILED DESCRIPTION OF THE PREFERRED EMBODIMENT

The present disclosure relates to a Braille display. The display supports an array of individual Braille cells with corresponding tactile pins. A Braille cell assembly controls the operation of each cell. The cell assembly includes a number of reeds that are attached to a printed circuit board (PCB) via electrical contacts. The reeds function to selectively lift tactile pins that generate Braille characters that can be felt by the user. The tactile pins associated with a series of cells are housed together in modular blocks. The Braille characters generated by the display correspond to visible characters, such as characters on a computer screen. The display is refreshable to allow for the sequential display of lines, paragraphs, or pages. In accordance with the disclosure, the display is constructed in a manner that minimizes labor and manufacturing costs and that permits the size of the display to be greatly reduced. The various components of the present invention, and the manner in which they interrelate, are described in greater detail hereinafter.

Braille Display Device

Figure 1:
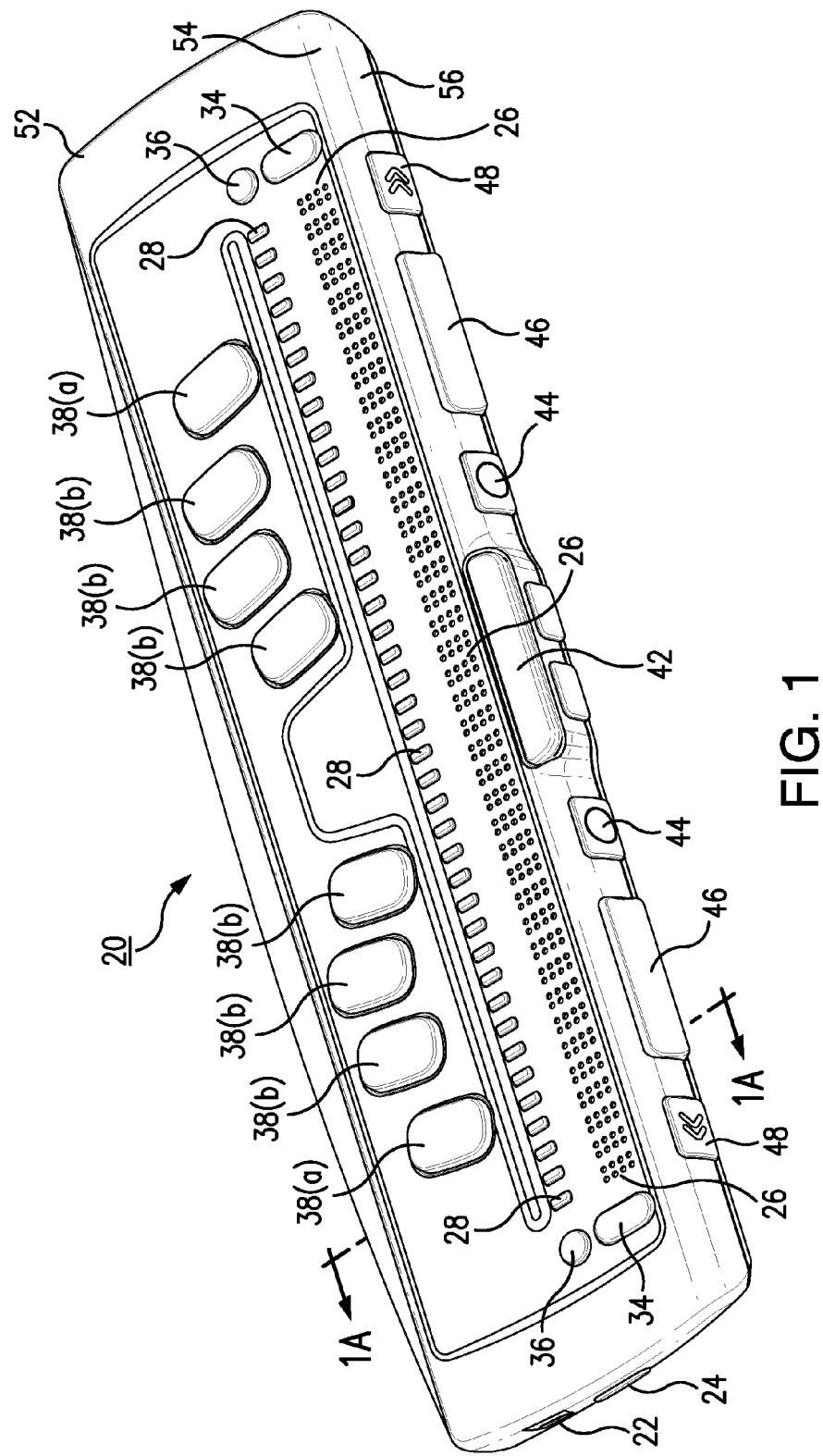
FIG. 1 is a perspective view of the Braille display of the present disclosure.

FIG. 1 is a perspective view of a Braille display 20 manufactured in accordance with the present disclosure. The side of display 20 includes a power button and a power port 22 for coupling display 20 to a conventional wall outlet. Alternatively, display 20 can be battery powered. A micro B USB port 24 is also included for coupling display 20 to a device such as a computer. Display 20 can alternatively be coupled via a wireless connection, such as Bluetooth®.

Refreshable Braille cells 26 are aligned across the front of display 20. In the depicted embodiment, display 20 includes a row of 40 Braille cells with 320 individual tactile pins.

Displays utilizing other cell arrangements, such as 20 or 80 cells, are within the scope of the invention. It is also within the scope of the invention to use a portable 14 cell arrangement. The cells 26 extend across a monolithic surface. As a result, there are no spaces or gaps between adjacent cells 26 of display 20. A cursor routing button 28 is associated with and located above each Braille cell 26. For sake of clarity, not all cells 26 and buttons 28 have been labeled with reference numerals. Cursor routing buttons 28 are used to move the cursor to a particular point or to select text. These serve as function keys or panning buttons. At either end of the display are a rocker key 34 and push button 36. Rocker key 34 is used to scroll up or down through the text being displayed. Push button 36 is a toggle control that selects whether the rocker key scrolls 34 through lines, paragraphs or pages of material. Display 20 can be programmed by the user to determine the scroll rate and the sensitivity of rocker keys 34.

A series of keys 38 are also aligned along the back of display 20. These include six inner keys 38(b) and two outer keys 38(a). In the depicted embodiment, keys 38 are Braille keys and are similar to those found on a conventional Perkins style keyboard. Keys 38 are angled inwardly towards the center line of the display to conform to the natural placement of a user's fingers. The space between the keys is not uniform. Namely, the two outer keys 38(a) are spaced further apart than the inner keys 38(b). The outer keys 38(a) are spaced further away to accommodate the natural extension and placement of a user's pinkey. A space key 42 is also centrally located adjacent the front edge of display 20 and is accessible via the user's thumbs.

Figure 3:
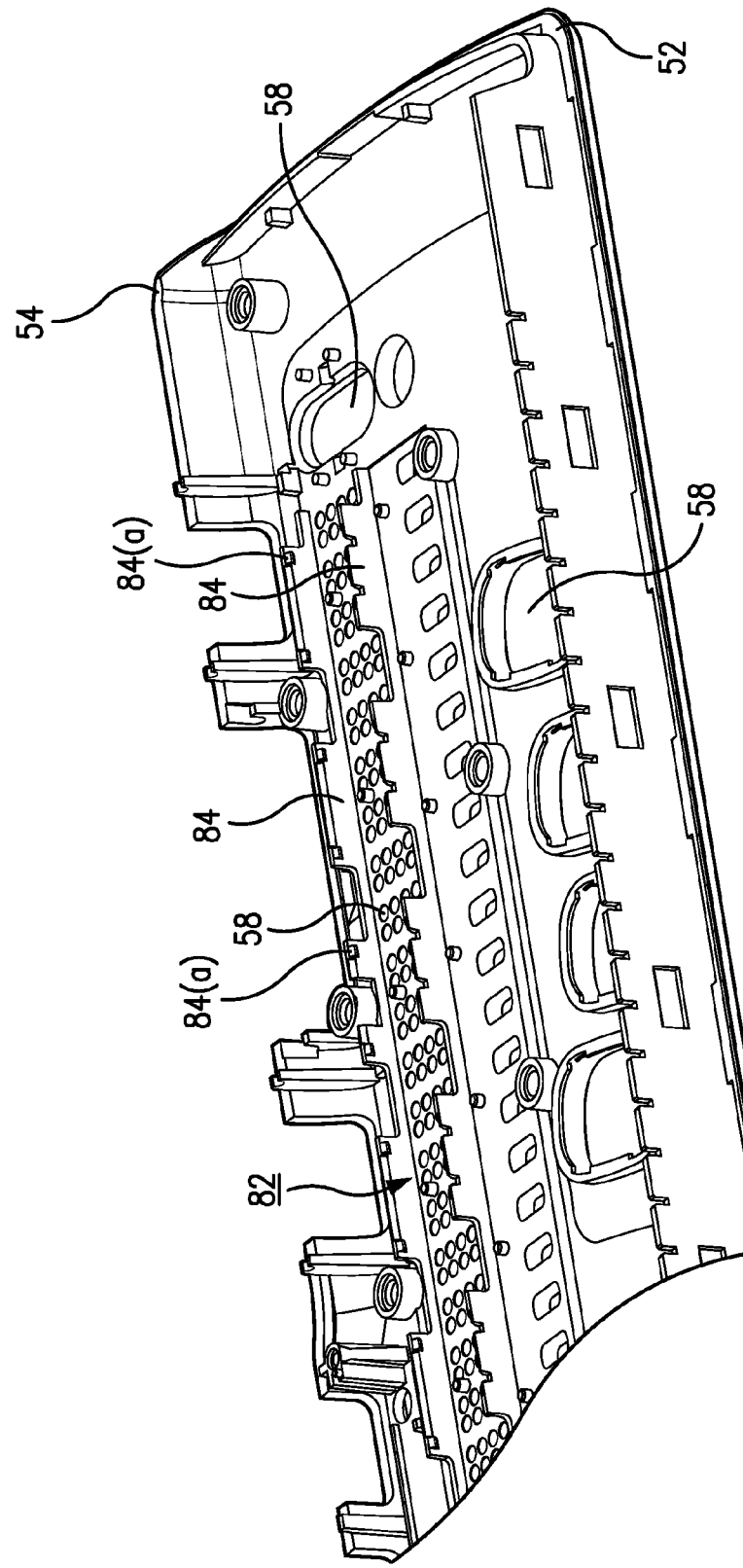
FIG. 3 is a detailed view of the inside of the upper cover of the Braille display.

The front surface of display 20 also contains selector buttons 44 that control an auto advance feature. Also included are rocker bars 46 for controlling upward and downward movement of the lines being displayed by Braille cells 26. Panning buttons 48 are also included that allow for panning left or right one display width. Display 20 includes an outer housing 52 formed from an upper cover 54 and a lower tray 56. Upper cover 54 and lower tray 56 can be injected molded from an impact resistant plastic. The upper cover and lower tray (54 and 56) are releasably joined together, such as by screws or other mechanical fasteners (not shown). As illustrated in FIG. 3, upper cover 54 includes openings 58 to accept tactile pins and keys associated with the display. FIG. 3 is an illustration of upper cover 54 in an inverted or upside down configuration so as to display features on the inner surface of cover 54.

Figure 6:
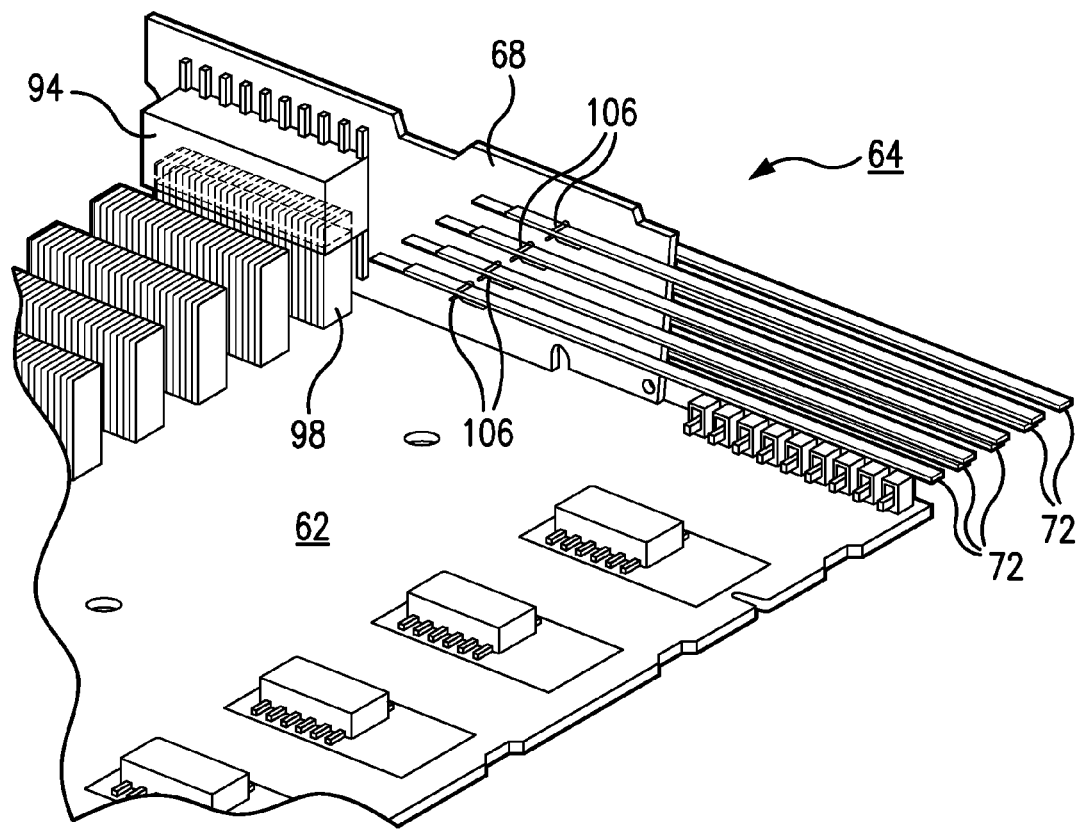
FIG. 6 is a perspective view of a Braille cell assembly interconnected to a backplane board.

A backplane board 62 is secured within the interior of housing 52 (note FIG. 6). As is known in the art, a series of Braille cell assemblies 64 are interconnected to backplane board 62. For sake of clarity, FIG. 6 only shows only cell assembly 64, but a series would be included in a complete display 20. Backplane board 62 includes an integrated motherboard. An example of a Braille cell assemblies being secured to a backplane board is disclosed in commonly owned U.S. Pat. No. 7,410,359 to Murphy et al. The contents of the '359 patent are incorporated by reference herein for all purposes. Each Braille cell assembly 64 (note FIG. 6) corresponds to an individual Braille cell 26 and supports a corresponding number of either six or eight tactile pins 66. More specifically, each cell assembly 64 includes a printed circuit board (PCB) 68 to which six or eight bimorph reeds 72 are secured. In the preferred embodiment, eight reeds 72 are included, with four reeds 72 being removably fastened to each side of PCB 68. The lower extent of each tactile pin 66 contacts the distal end of a corresponding reed 72. As explained in more detail hereinafter, an individual tactile pin 66 can be selectively raised by applying a voltage to the corresponding reed 72. The applied voltage creates a bending moment in the corresponding reed 72 which, in turn, flexes the distal end of reed 72 upwardly to lift an associated pin 66.

Reeds 72 are preferably parallel polled bimorphs. As is well known in the art, bimorphs are flexure elements that consist of two expander plates bonded to a metal vane. The polarization of the plates causes one plate to expand and the other to contract upon the application of a voltage. This, in turn, causes the bimorph to bend. Bimorphs can either be series polled or parallel polled. In a series polled bimorph, the plates are polarized in the same direction with respect to the vane. In a parallel polled bimorph, the plates are polarized in opposite directions with respect to the center vane. In the series type bimorphs, electrical connections are made to the two outer plates (via electrodes) and no connection is made to the center vane. In the parallel type bimorphs, one electrical lead goes to the center vane and the other lead goes to the two outer plates (via electrodes). Examples of series and parallel polled bimorphs are disclosed in commonly owned U.S. Pat. No. 7,367,806 to Murphy et al. Contents of the '806 patent are incorporated by reference herein for all purposes. Although either parallel or series polled bimorphs can be employed in connection with the present disclosure, parallel polled bimorphs are preferred.

Modular Mounting Blocks

Figure 1A:
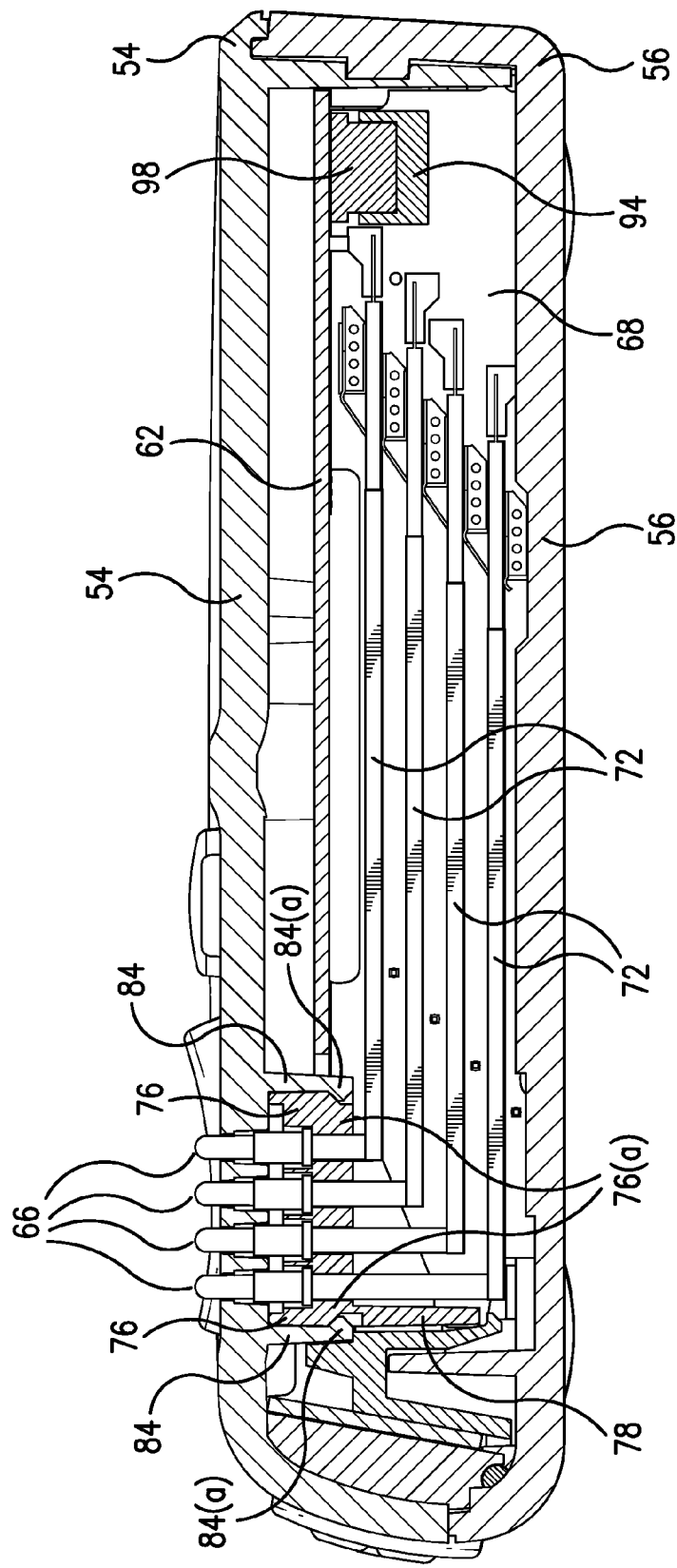
FIG. 1A is a cross-section of the Braille display taken along Line 1A-1A of FIG. 1.
Figure 2:
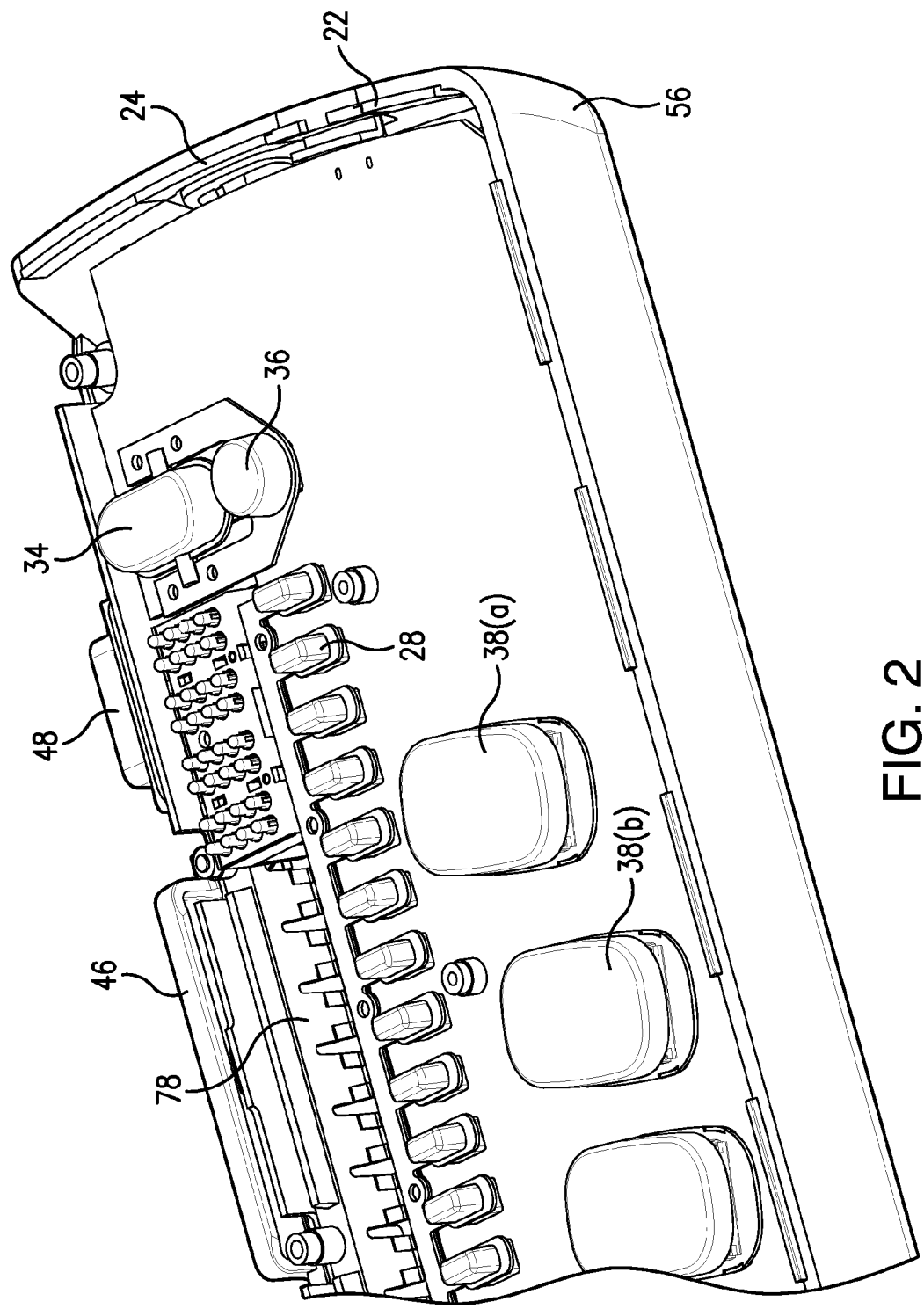
FIG. 2 is a detailed view of the Braille display with the upper cover removed.
Figure 4:
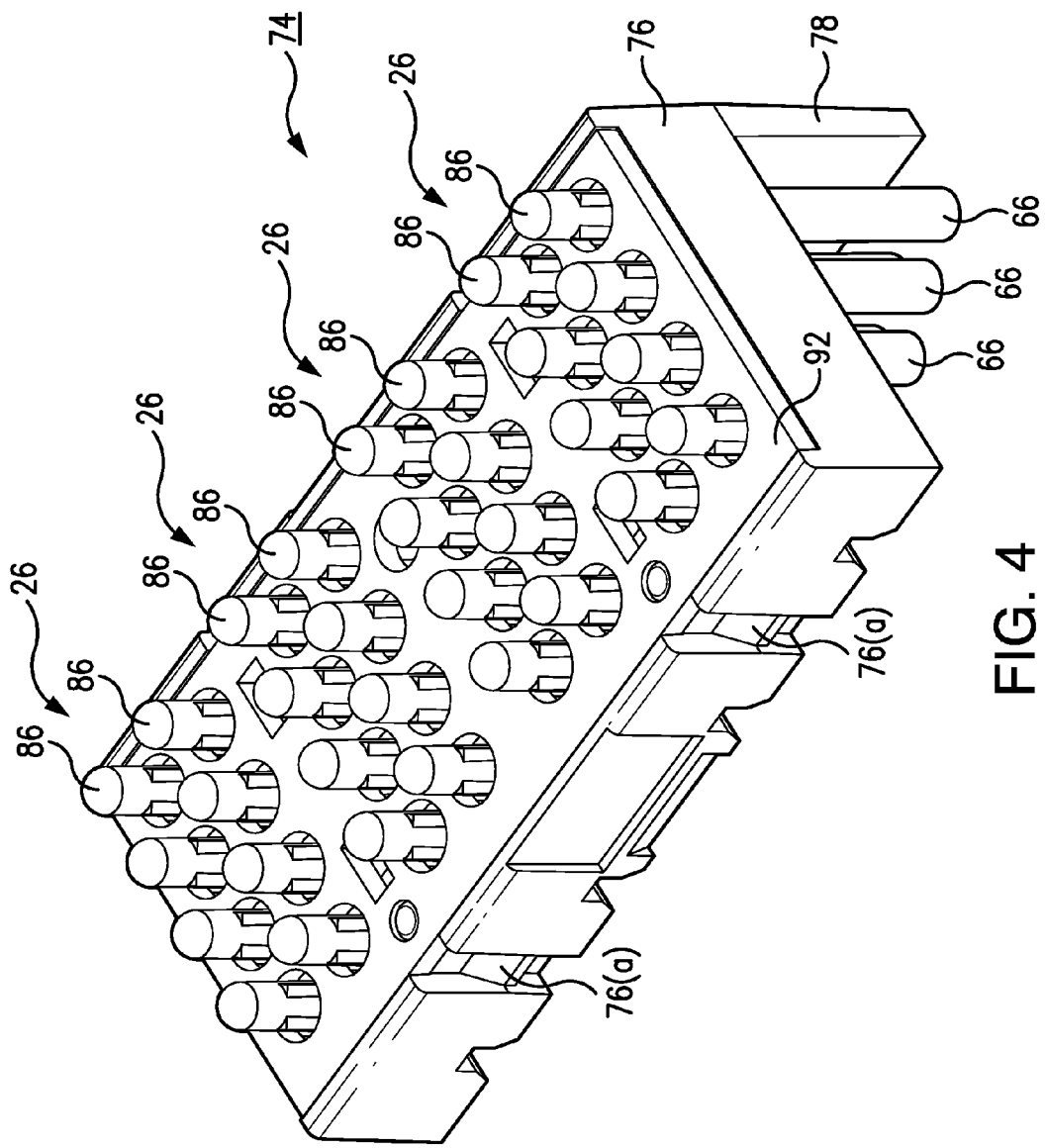
FIG. 4 is a perspective view of a four cell mounting block for housing the tactile pins associated with the Braille display.
Figure 4A:
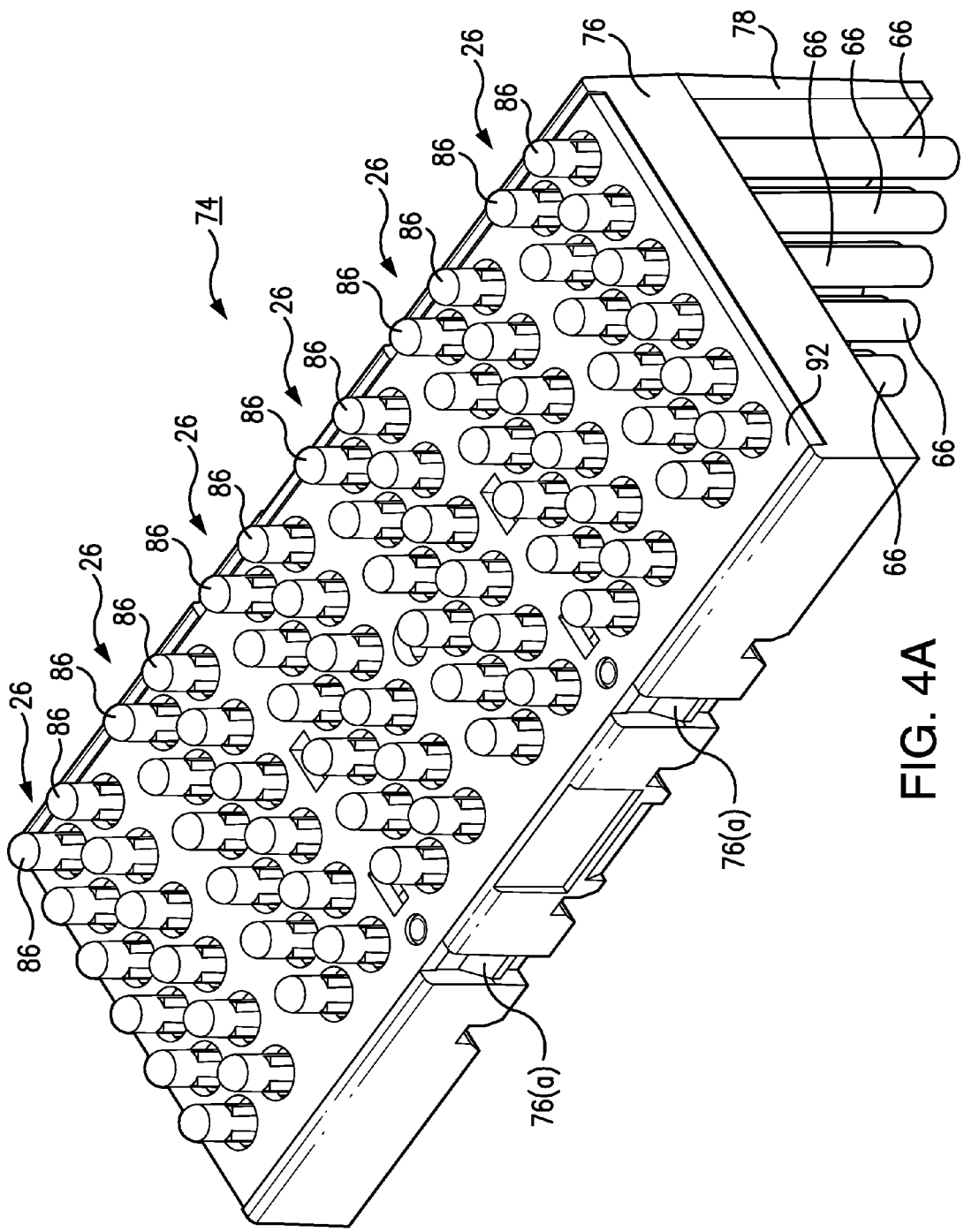
FIG. 4A is a perspective view of a six cell mounting block for housing the tactile pins associated with the Braille display.

In accordance with the present disclosure, tactile pins 66 are held in groups via a mounting block 74. Each mounting block includes a housing 76 with an array of apertures. Blocks 74 can support pins 66 in either four or six cell arrangements. FIG. 4 illustrates a four cell mounting block 74; FIG. 4A illustrates a six cell mounting block 74. Each block 74 further includes a depending forward edge 78. Depending forward edge 78 is received within a channel positioned within the lower tray 56 of housing 52 (note FIG. 1A). As best illustrated in FIG. 3, the inside surface of upper cover 54 includes a channel 82 formed from two opposing walls 84. Walls 84 are adapted to receive a block 74 in a friction-type fit. To accomplish this, walls 84 include locking features 84(a) (which may be male features) that snap fit into corresponding locking features 76(a) (which may be female features) within housing 76 (note FIG. 1A). Walls 84 span the length of upper cover 54. Thus, a series of different blocks 74 can be snap fit into the length of channel 82. For example, for the 40 cell display depicted in FIG. 1, a series of ten, four cell blocks 74 can be snapped into channel 82.

During assembly, mounting blocks 74 can be initially held within upper cover 54 and thereafter inserted into the forward edge of lower tray 56. Once positioned, the lower extent of each pin 66 contacts the reed 72 of an associated cell assembly 64. Different configurations of mounting blocks 74 can be utilized depending upon the size of display 20. For instance, for a portable display utilizing 14 total Braille cells, one six cell block and two four cell blocks can be utilized. In a display using 20 Braille cells, two six cell blocks and two four cell blocks can be utilized. Still yet other arrangements can be used for different sized displays. One benefit of encasing the tactile pins 66 in modular groups via blocks 74 is that it creates a more serviceable product. In prior art units, pins 66 would become loose and scatter when removing the cover. Modular arrangements of pins also eliminates tolerance stack up across the length of the display. By providing the blocks 74 in four and six cell arrangements, a variety of sized displays 20 can be created.

Figure 5:
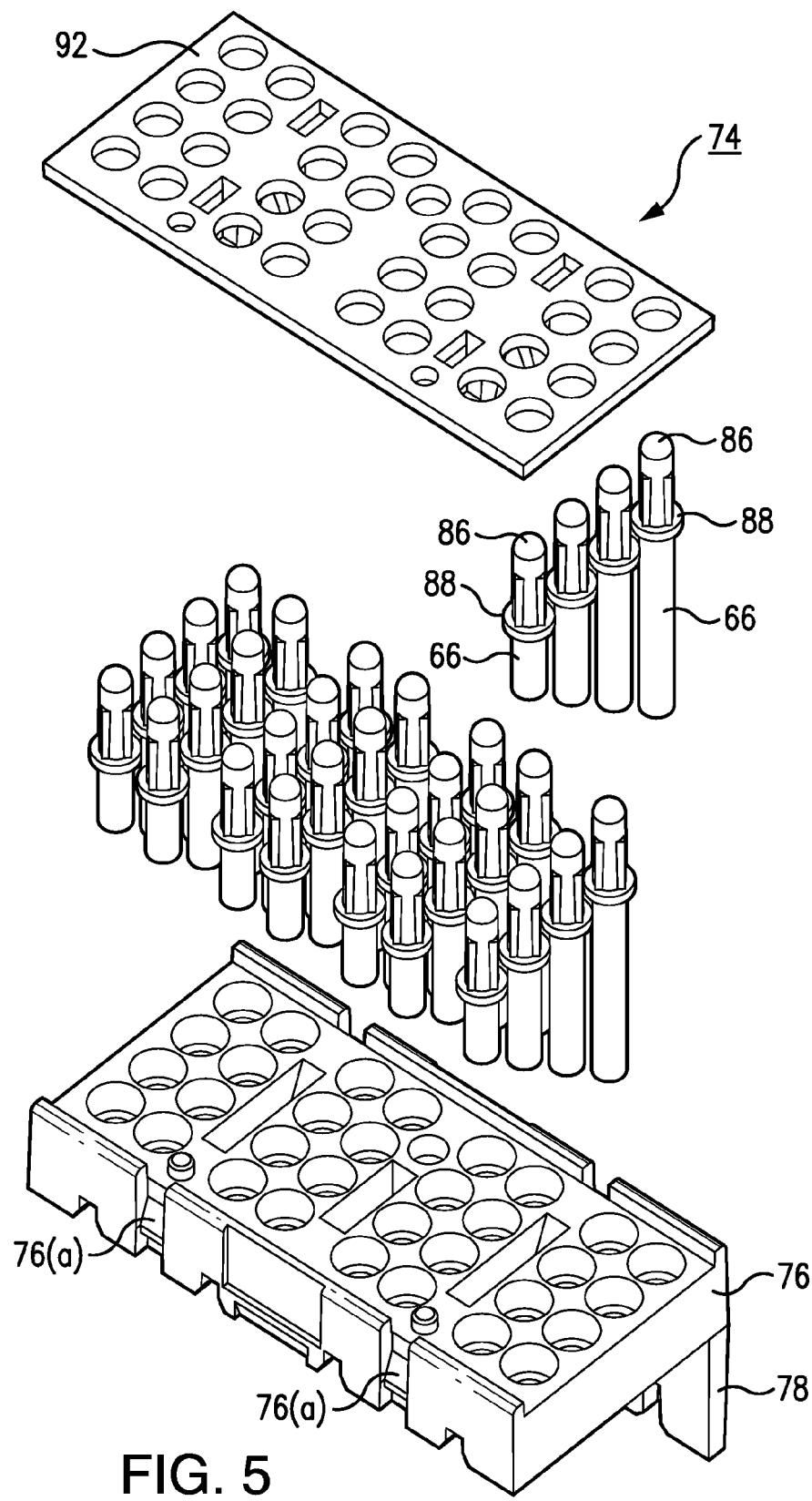
FIG. 5 is an exploded view of the mounting block of FIG. 4.

As best illustrated in the exploded view of FIG. 5, each of the tactile pins 66 includes a rounded upper extent 86 that is adapted to be extended above cover 54 and felt by the user. A collar 88 is also included about each pin along its length. A plate 92 is secured over top of each mounting block 74 via a snap fit connection (note FIG. 5). Plate 92 includes apertures that are sized to accommodate the upper extent 86 of pins 66 but that are smaller than collars 88. Thus, plates 92 function in limiting the upward travel of pins 66. Plate 92 is particularly useful during the assembly process. Namely, after installing blocks 74 into channel 82 of upper cover 54, pins 66 may be inverted as cover 54 is mated with lower tray 56.

Braille Cell Assemblies

The Braille cell assemblies 64 are described next. Each cell assembly 64 includes a PCB that is removeably and electronically coupled to backplane board 62. When secured, PCB's 68 are perpendicular to backplane board 62. The total number of cell assemblies 64 involved will correspond to the number of Braille cells 26 contained within display 20. Each PCB includes a female electrical connector 94 at its proximal end. This female electrical connector 94 is adapted to be coupled to a corresponding male connector 98 on the backplane board 62. PCBs 68 can be removed and replaced as needed. Each PCB 68 also includes a series of stops 104 along the intermediate extent (note FIG. 7). The function of stops 104 is described in greater detail hereinafter.

A series of bimorph reeds 72 are interconnected to either side of the PCB 68 by way of electrical contacts 106. More specifically, four reeds 72 are connected to each side of PCB 68. The distal end of each reed 72 is positioned beneath a corresponding tactile pin 66 (note FIG. 1A). Upon the application of a voltage, an individual reed 72 applies the upward force necessary to expose a corresponding pin 66 through upper housing 54. Each PCB 68 controls the operation of an individual Braille cell 26. Each of the contacts 106 includes a base portion 108, a support arm 112, and a biasing arm 114. Base portion 108 can include a series of apertures to decrease the weight of the contact. Each base 108 is adapted to be soldered to a PCB 68 using any of a variety of well known soldering techniques. When installed, support arm 112 of contact 106 is perpendicular to the face of PCB 68 and parallel to the backplane board 62. Additionally, biasing arm 114 is angled at approximately a 45° angle relative to support arm 112. Contacts 106 are preferably mounted in a staggered or stairstep arrangement. Namely, the uppermost contact 106 is closest to the proximal end of PCB 68 and the lowermost contact 106 is closest to the distal end of PCB 68. When installed, reeds 72 have a similar staggered configuration. The staggered arrangement of reeds 72 allows the pins 66 to be aligned in rows. Each row of the Braille cell 26 corresponds to one side of the PCB 68.

When soldered in place, contacts 106 are separated from one another and are electrically insulated. Adjacent contacts 106 form a fulcrum point 116 for an associated bimorph reed 72. Each of these fulcrum points 116 is created between the biasing arm 114 of an upper contact 106 and the support arm 112 of a lower and adjacent contact 106. When so arranged, biasing arm 114 forms an electrical contact with an electrode on the upper surface of reed 72 and support arm 112 of the immediately adjacent contact 106 forms an electrical contact with an electrode on the lower surface of reed 72. Reed 72 is configured to bend about this fulcrum point 116 upon application of a voltage to upper and lower contacts 106. Each of the bimorph reeds 72 is adapted to be inserted into one of these fulcrum points 116. The intermediate extent of the bimorph 72 is then placed adjacent to a corresponding stop 104. Stop 104 functions in limiting the downward bending moment of reed 72 and otherwise prevents interference between adjacent reeds 72. Stops 104 thereby permit reeds 72 to be more closely positioned and allows for much tighter tolerances.

Once installed, the electrical connectors (94 and 98) provide voltage to the corresponding PCB 68 and allow voltage of opposite polarity to be delivered to the contacts 106 on PCB 68. Namely, a negative voltage is applied to a first series of contacts 106 and a positive voltage is applied to a second series of contacts 106. Thus, for example, a positive voltage may be applied to the upper most contact 106 while a negative voltage is applied to the adjacent and lower contact 106. Adjacent contacts 106 are exposed to voltages of opposite polarity. This, in turn, allows opposite polarity voltage to be applied to the upper and lower surfaces of an individual reed 72. Namely, biasing arm 114 can apply a positive voltage to the upper surface of reed 72 while the lower support arm 112 of an adjacent contact 106 applies a negative voltage to the lower surface of the same reed 72. By applying the voltage in this manner, each bimorph reed 72 can be bent upon application of opposite polarity voltage. As a result, a corresponding tactile pin 66 is lifted. The pin 66 is lowered when the voltage is removed.

Method of Installing Contacts

The present disclosure also relates to an improved method for installing the electrical contacts 106 upon a PCB 68. The method utilizes an alignment guide 118 for orienting a series of contacts 106 upon PCB 68. Alignment guide 118 includes first and second surfaces (122 and 124) that are angled with respect to each other. In the depicted embodiment, the first and second surfaces (122 and 124) are at a right angle to each other. Alignment tabs 126 are formed at either end of second surface 124. Alignment tabs 126 are dimensioned to fit into corresponding apertures 128 present on PCB 68. The series of contacts 106 are releasably secured to a peripheral edge 132 of the second surface 124 of guide 118. Contacts 106 are preferably connected to the second surface 124 via a score line. The score line is frangible and allows the contacts 106 to be separated by bending alignment guide 118 after contacts 106 have been soldered to PCB 68. In the depicted and preferred embodiment, a series of five contacts 106 are secured to the second surface 124 of alignment guide 118.

Figure 9:
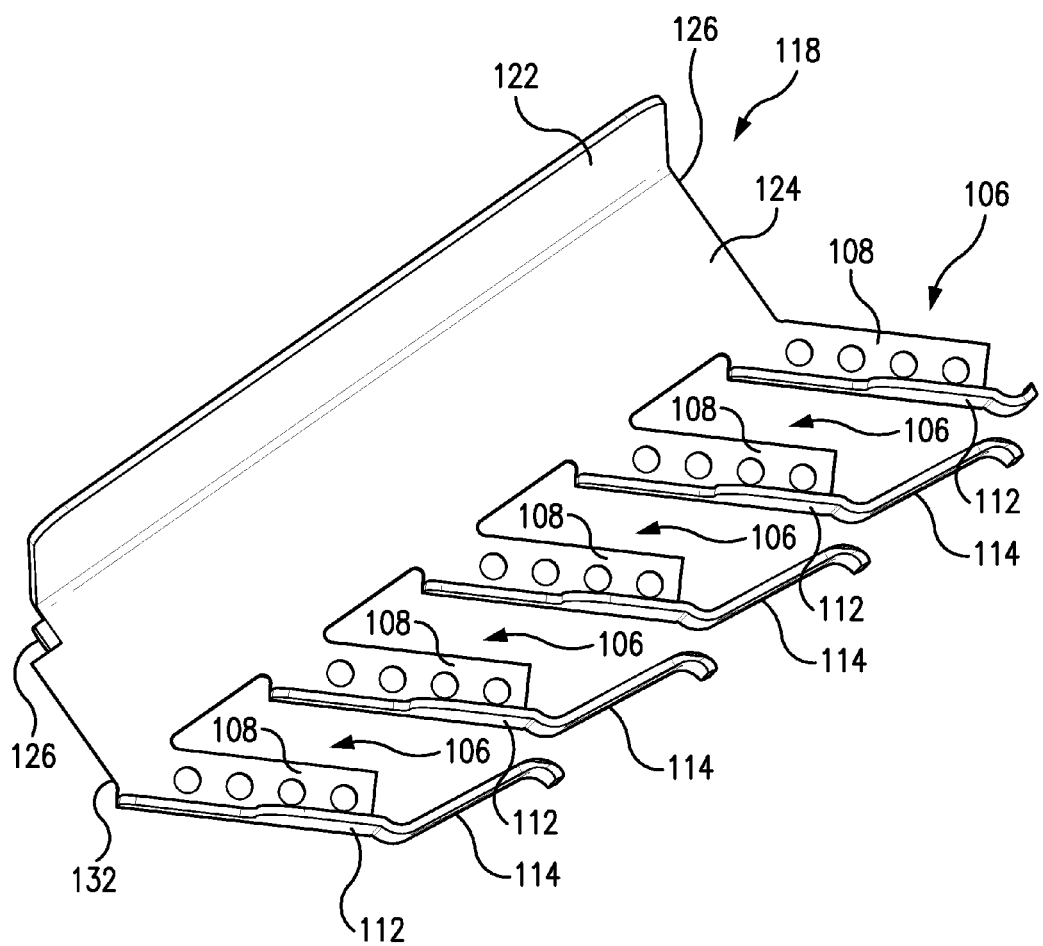
FIG. 9 is a perspective view of a series of contacts mounted to an alignment guide.
Figure 9A:
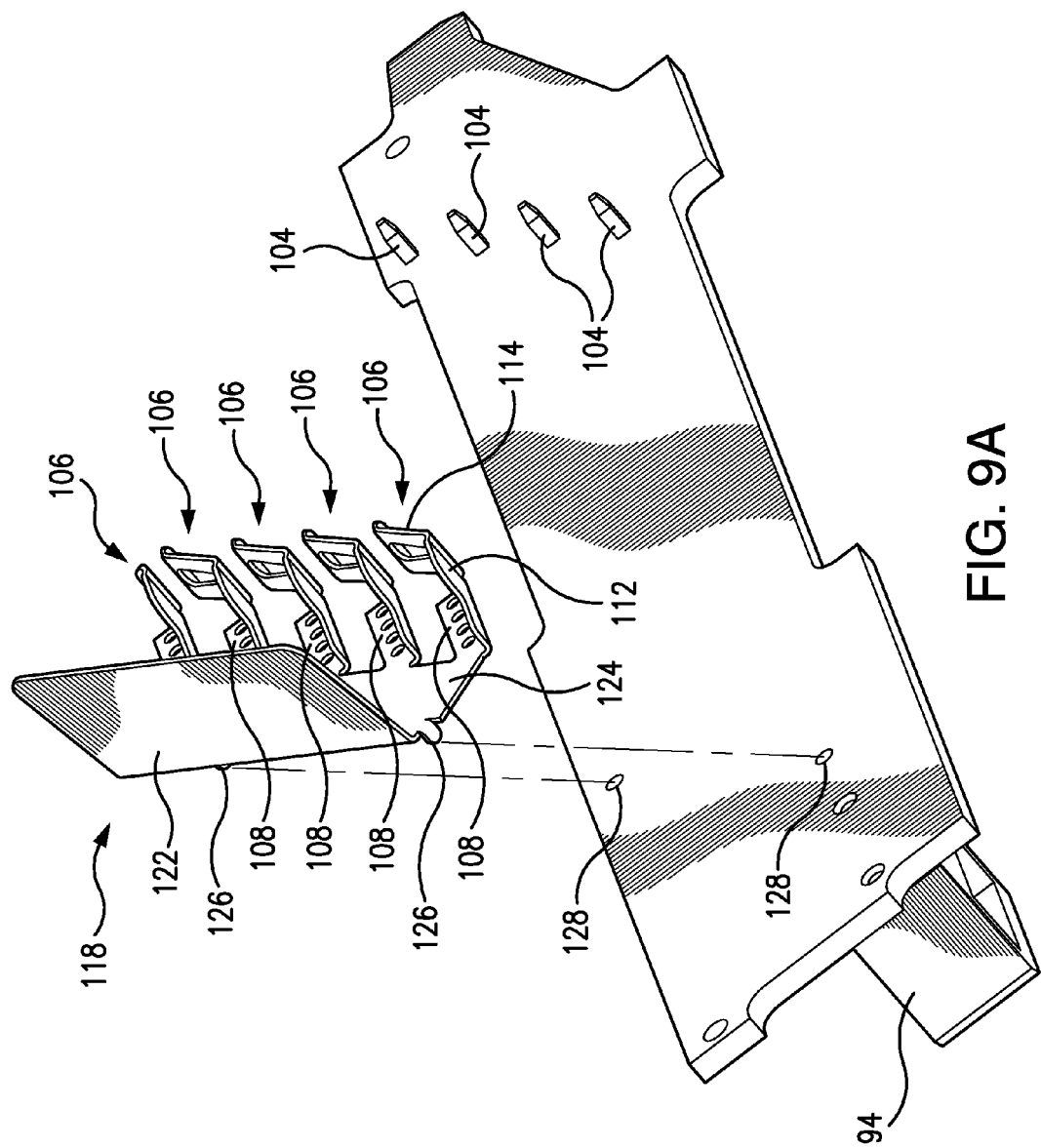
FIG. 9A is a perspective view of the alignment guide being registered with a printed circuit board.
Figure 10:
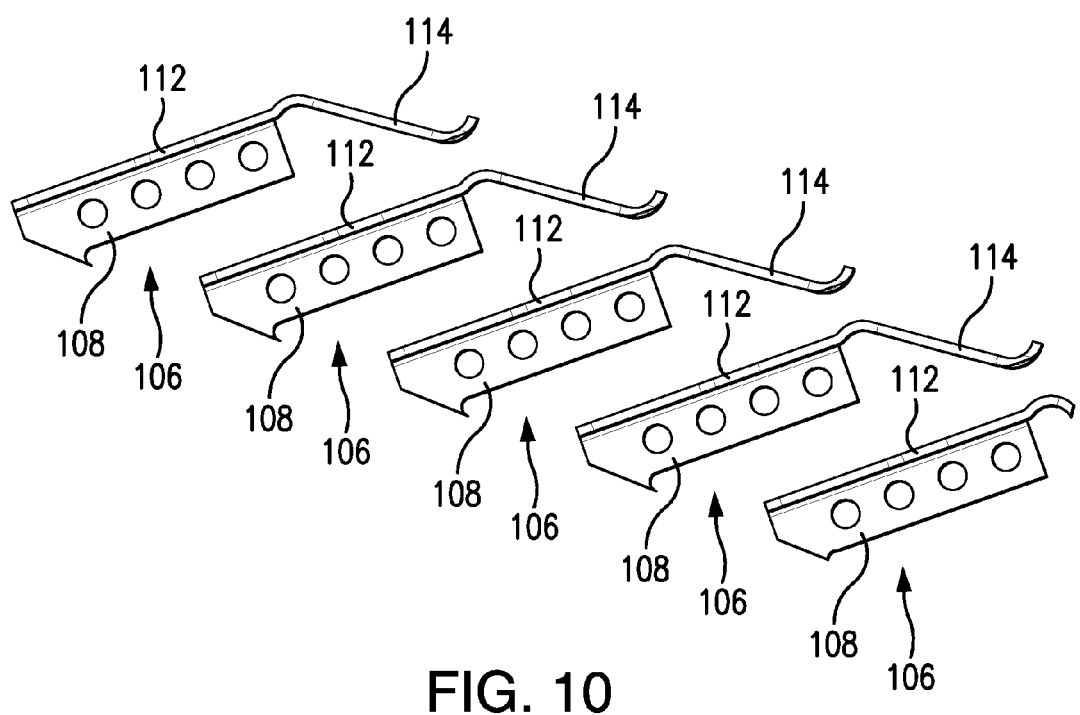
FIG. 10 is a perspective view of the contacts removed from the alignment guide.

The installation method involves positioning the alignment guide 118 with the attached contacts 106 upon the PCB 68. As best illustrated in FIG. 9A, this is accomplished by inserting the tabs 126 on guide 118 into the alignment apertures 128 of PCB 68. With the alignment guide 118 so positioned, the series of contacts 106 are properly aligned and spaced upon PCB 68 and are ready to receive reeds 72 between adjacent contacts 106. Base portion 108 of each contact 106 is adapted to rest against the surface of PCB 68. This also places each of the contacts 106 in a staggered relationship to each other. Namely, the uppermost contact 106 is closest to the rearward edge of PCB 68 and the lowermost contact 106 is closest to the forward edge of PCB 68. This arrangement allows the bimorph reeds 72 to be similarly arranged in a staggered—or stairstep—fashion.

Once the contacts 106 have been properly positioned via the alignment guide 118 (and tabs 126 and apertures 128), they are ready to be affixed to PCB 68. In the preferred embodiment, the base 108 of each contact 106 is soldered into place. This can be done via a conventional soldering iron. Other known soldering techniques can be employed, such as wave soldering or reflow soldering. In the preferred embodiment, an infrared ("IR") reflow solder process is employed. Regardless of the technique employed, an electrical contact is formed between the base 108 of each contact 106 and an underlying circuit upon PCB 68.

When properly oriented, the support and biasing arms (112 and 114) of each contact 106 are perpendicular to the face of PCB 68. Additionally, the biasing arm 114 is oriented at approximately a 45° angle to the interconnected support arm 112. A space is created between the lower extent of a biasing arm 114 and the support arm 112 of an adjacent contact 106. This space is the fulcrum point 116 into which a bimorph reed 72 is inserted. As noted, in the preferred embodiment, five different contacts 106 are secured to each side of PCB 68. This results in the formation of four fulcrum points 116 between the adjacent contacts 106. As illustrated, the biasing arm 114 of the lowermost contact can be eliminated. Likewise, the support arm 112 of the uppermost contact, while present, is unused.

Once the contacts 106 are soldered, the alignment guide 118 can be removed. This is achieved by bending the alignment guide 118 with respect to the soldered contacts 106. The user preferably uses the first surface 122 of the guide 118 as a handle to bend the guide 118 back and forth until the score line is broken. Once the score line is broken, the soldered contacts 106 are separated from alignment guide 118. The alignment guide 118 can thereafter be disposed. A new alignment guide 118 can then be used to align and solder another series of five contacts 106 to the opposite side of PCB 68. After the contacts 106 are secured to each side of PCB 68, the bimorph reeds 72 can be inserted into the corresponding fulcrum points 116. This process is the repeated for each Braille cell assembly 64 of the display 20.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A refreshable Braille display, the display including a series of individual Braille cells, the display comprising:
   a housing having forward and rearward extents, the housing also having an interior, an upper cover, and a lower tray, the upper cover having apertures for receiving Braille pins, and a series of openings for receiving keys, a channel formed within the upper cover;
   a motherboard mounted within the interior of the housing, the motherboard being interconnected to a series of Braille cell assemblies, each of the Braille cell assemblies corresponding to an individual Braille cell and supporting eight (8) bimorph reeds;
   a series of mounting blocks, each mounting block having a housing with an array of pin apertures, the housing further including a depending edge, the mounting blocks being releasably secured within the channel within the upper cover;
   a series of tactile pins, each of the tactile pins including an curved upper end and an length, the series of tactile pins being positioned within the pin apertures of the mounting blocks, each tactile pin including a collar located along its length;
   a plate secured over top of the series of tactile pins, the plate including openings that permit the passage of the tactile pins, the openings having a size that is smaller than the diameter of the collars located on the tactile pins to thereby limit the upward movement of the tactile pins.

2. A Braille display including a number of Braille cells, the display comprising:
   a housing having forward and rearward extents, the housing also having an interior, an upper cover, and a lower tray, the upper cover having apertures for receiving Braille pins;
   a motherboard mounted within the interior of the housing, the motherboard being interconnected to a series of Braille cell assemblies, each of the Braille cell assemblies corresponding to one of the Braille cells;
   a mounting block having a housing, the mounting block being positioned with the interior of the housing;
   a series of tactile pins housed within the mounting block, whereby the mounting block keeps the tactile pins together as a modular unit.

3. The Braille display as described in claim 2 wherein the mounting block houses a number of tactile pins sufficient for four different Braille cells.

4. The Braille display as described in claim 2 wherein the mounting block houses a number of tactile pins sufficient for six different Braille cells.

5. The Braille display as described in claim 2 further comprising a plate secured over top of the mounting block, wherein the plate limits the upward movement of the tactile pins.

6. The Braille display as described in claim 2 further comprising:
   a channel with opposing walls formed within an interior surface of the upper cover, each of the opposing walls having a series of male locking features;
   the mounting block having a series of female locking features;
   the mounting block being releasably secured within the channel by connecting the male and female locking features.

7. A Braille cell assembly adapted to be removably connected to a motherboard within a refreshable Braille display, the Braille cell assembly comprising:
   a printed circuit board having a proximal end, a distal end, and an intermediate extent therebetween, the printed circuit board including opposing sides and upper and lower edges, a female electrical connector interconnected to the printed circuit board adjacent the proximal end, a series of stops formed on the opposing sides of the printed circuit board along the intermediate extent;
   a motherboard with a male electrical connector, the female electrical connector of the printed circuit board being coupled to the male electrical connector of the motherboard;
   a series of adjacent contacts mounted to each of the opposing sides of the printed circuit board, each contact formed from a base portion, a support arm, and a biasing arm, the biasing arm being angled with respect to the support arm, the base portion of each contact being soldered to the printed circuit board, with the series of adjacent contacts being mounted in a staggered arrangement, a series of fulcrum points, each fulcrum point created between the biasing arm of an upper contact and the support arm of a lower contact;
   a series of bimorph reeds, each bimorph reed having a proximal end, a distal end, and an intermediate extent therebetween, each bimorph reed also having upper and lower surfaces, the proximal end of each bimorph reed being secured to a corresponding fulcrum point, with the biasing arm of the upper contact contacting the upper surface of the bimorph reed and the support arm of the lower contact contacting the lower surface of the bimorph reed, the intermediate extent of the bimorph reed being positioned adjacent a corresponding stop;

a voltage source delivering voltage of opposite polarity to adjacent contacts via the male and female electrical connectors, whereby the upper and lower surfaces of the corresponding bimorph reed are exposed to voltages of opposite polarity.

8. A Braille cell assembly comprising:
a printed circuit board having opposing sides;
a series of adjacent electrical contacts mounted to the printed circuit board, the adjacent electrical contacts being insulated from one another, a fulcrum point being created between adjacent electrical contacts;
a series of bimorph reeds, each bimorph reed including an upper and lower surface and being secured to a corresponding fulcrum point;
a power source for delivering voltage of opposite polarity to adjacent electrical contacts, whereby voltage of opposite polarity is delivered to the upper and lower surfaces of the corresponding bimorph reed via the corresponding fulcrum point.

9. The Braille cell assembly as described in claim 8 further comprising a series of stops formed on the printed circuit board for limiting the movement of the bimorph reeds.

10. The Braille cell assembly as described in claim 8 wherein the series of adjacent contacts are mounted in a staggered fashion.

11. The Braille cell assembly as described in claim 8 wherein each electrical contact is formed from a base portion, a support arm, and a biasing arm, the base portion of each contact being soldered to the printed circuit board, and wherein each fulcrum point is created between the biasing arm of an upper contact and the support arm of a lower contact.

12. The Braille cell assembly as described in claim 11 wherein the biasing arms and support arms are electrodes that make an electrical connection to the upper and lower surfaces of a corresponding bimorph reed.

13. A method for assembling a Braille cell assembly, the Braille cell assembly including a printed circuit board (PCB) having alignment apertures and a series of bimorph reeds, the method utilizing an alignment guide, the alignment guide having first and second surfaces that are angled with respect to each other, the second surface having a pair of alignment tabs and a peripheral edge, a series of contacts releasably secured to the peripheral edge of the alignment guide via a score line, each of the contacts formed from a base portion, a support arm, and a biasing arm, the method comprising the following steps:
positioning the alignment guide upon the printed circuit board by inserting the alignment tabs into the alignment apertures, whereby the series of contacts are aligned upon the PCB in a staggered relationship;
passing the PCB through an IR reflow solder process, whereby the base portion of each contact is soldered onto the PCB and the support arm and biasing arm of adjacent contacts form a fulcrum point;
separating the alignment guide from the soldered contacts by bending the alignment guide to break the score line;
inserting each of the bimorph reeds into a corresponding fulcrum point created by adjacent contacts.

14. A method for assembling a Braille cell assembly, the Braille cell assembly including a printed circuit board (PCB) having an alignment aperture, the method utilizing an alignment guide, the alignment guide having first and second surfaces, the second surface having an alignment tab and a peripheral edge, a series of contacts releasably secured to the peripheral edge of the alignment guide, the method comprising the following steps:
positioning the alignment guide upon the printed circuit board by inserting the alignment tab into the alignment aperture, whereby the series of contacts are aligned upon the PCB;
soldering each contact onto the PCB;
separating the alignment guide from the soldered contacts.

15. The method as described in claim 14 wherein the soldering step is carried out by IR reflow soldering.

16. The method as described in claim 14 comprising the further step of inserting each of the bimorph reeds into a corresponding fulcrum point created by adjacent contacts.

* * * * *

UNITED STATES PATENT AND TRADEMARK OFFICE
CERTIFICATE OF CORRECTION

PATENT NO. : 8,690,576 B2  
APPLICATION NO. : 13/407364  
DATED : April 8, 2014  
INVENTOR(S) : Patrick Murphy et al.

Page 1 of 1

Figure 7:
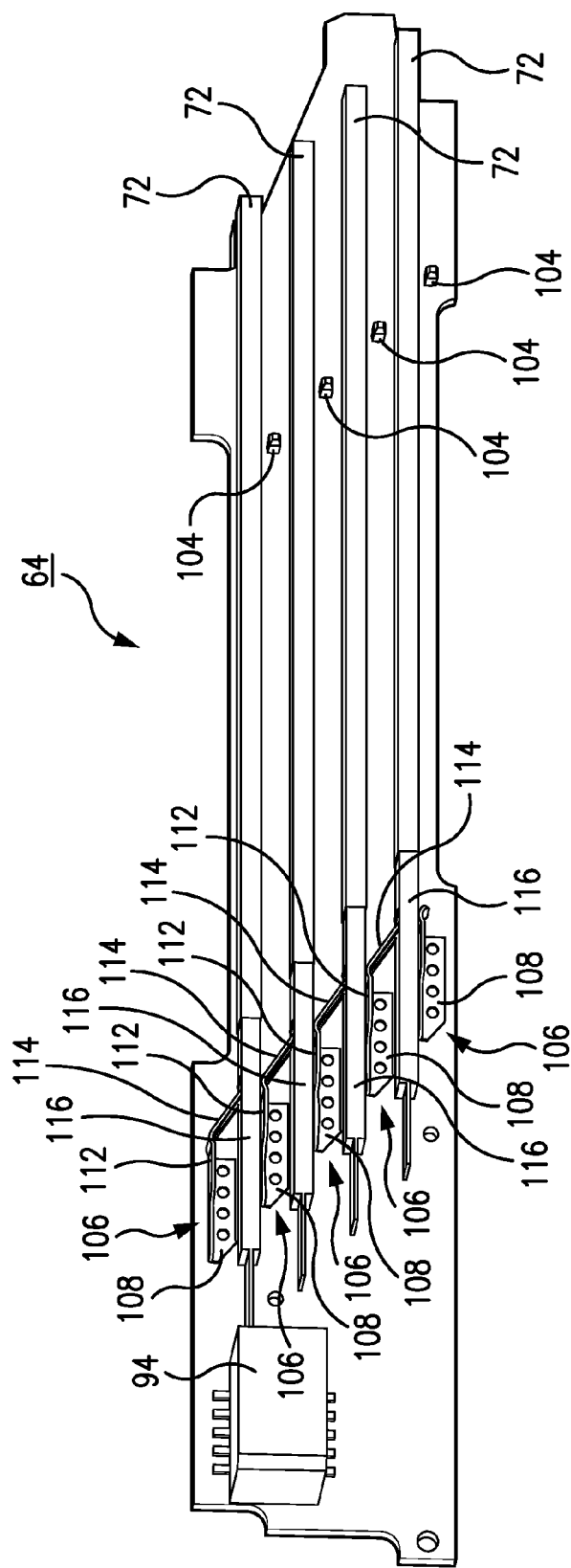
FIG. 7 is a side elevational view of a Braille cell assembly.
Figure 8:
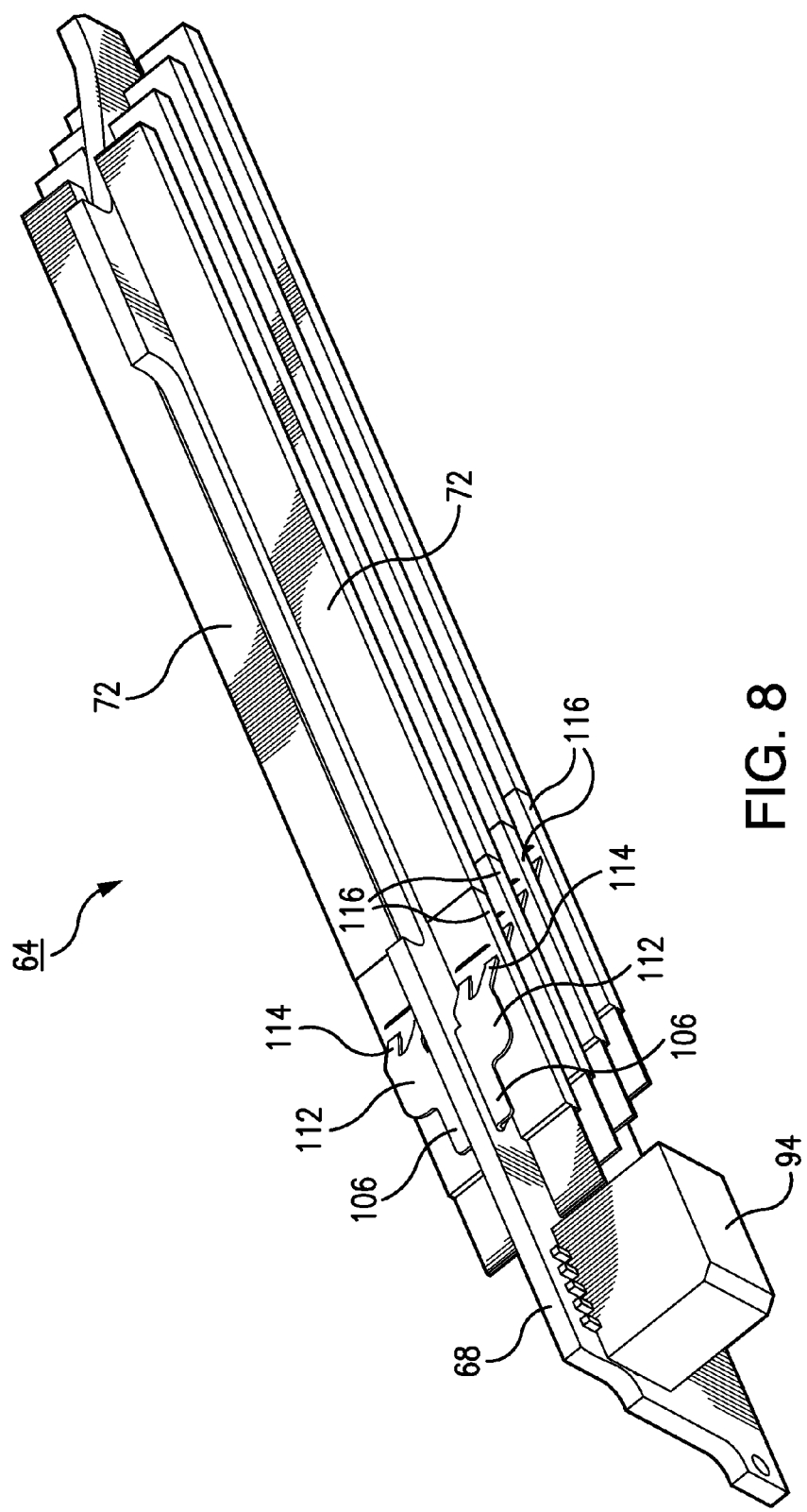
FIG. 8 is a top perspective view of the Braille cell assembly of FIG. 7.

It is certified that error appears in the above-identified patent and that said Letters Patent is hereby corrected as shown below:

In the specification:

Col. 7, line 41, the phrase "Namely, the uppermost contact 106" should be "Namely, with reference to FIG. 7, the uppermost contact 106".

Col. 7, line 51, the phrase "Each of these fulcrum points 116" should be "As indicated in FIG. 7, each of these fulcrum points 116".

Col. 8, line 49, the phrase "Namely, the uppermost contact 106" should be "Namely, with reference to FIG. 7, the uppermost contact 106".

Col. 8, line 65, the phrase "When properly oriented, the support" should be "When properly oriented (as in FIG. 7) the support".

Signed and Sealed this  
Twenty-ninth Day of July, 2014

Michelle K. Lee  
*Deputy Director of the United States Patent and Trademark Office*